US010593924B2

(12) United States Patent
Zachar et al.

(10) Patent No.: US 10,593,924 B2
(45) Date of Patent: Mar. 17, 2020

(54) CELL CONTACT-MAKING SYSTEM, CELL MODULE AND METHOD FOR PRODUCING A CELL MODULE

(71) Applicant: Bayerische Motoren Werke Aktiengesellschaft, Munich (DE)

(72) Inventors: Christian Zachar, Groebenzell (DE); Kilian Friedrich, Munich (DE); Ruediger Daub, Groebenzell (DE); Robert Lustig, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 158 days.

(21) Appl. No.: 16/003,671

(22) Filed: Jun. 8, 2018

(65) Prior Publication Data

US 2018/0294466 A1    Oct. 11, 2018

Related U.S. Application Data

(63) Continuation of application No. PCT/EP2016/078509, filed on Nov. 23, 2016.

(30) Foreign Application Priority Data

Dec. 10, 2015    (DE) ......................... 10 2015 224 785

(51) Int. Cl.
*H01M 2/20* (2006.01)
*H01M 2/10* (2006.01)
*H01M 10/42* (2006.01)

(52) U.S. Cl.
CPC ......... *H01M 2/206* (2013.01); *H01M 2/1077* (2013.01); *H01M 10/4207* (2013.01); *H01M 2220/20* (2013.01)

(58) Field of Classification Search
None
See application file for complete search history.

(56) References Cited

U.S. PATENT DOCUMENTS

| 2014/0079982 | A1* | 3/2014 | Laderer | ............... | H01M 2/1016 |
| | | | | | 429/159 |
| 2015/0155531 | A1* | 6/2015 | Takahagi | .............. | H01M 2/026 |
| | | | | | 429/163 |

(Continued)

FOREIGN PATENT DOCUMENTS

| DE | 10 2011 076 889 A1 | 12/2012 |
| DE | 10 2012 205 019 A1 | 10/2013 |

(Continued)

OTHER PUBLICATIONS

International Search Report (PCT/ISA/210) issued in PCT Application No. PCT/EP2016/078509 dated Jan. 5, 2017 with English Translation (seven (7) pages).

(Continued)

*Primary Examiner* — Wyatt P McConnell
(74) *Attorney, Agent, or Firm* — Crowell & Moring LLP

(57) ABSTRACT

A cell contact-making system for a cell module which has at least two electrochemical cells includes at least one support component, which can be fixed to the other cell module, for supporting at least one cell connector, which electrically connects the two electrochemical cells to one another. At least one covering component covers the cell connector on a side which is averted from the electrochemical cells. In order to provide an automated cell contact-making system which is producible in a more cost-effective manner and has integrated electric shock protection, the covering component is a flexible plastic film and, in a stretched state, is partially cohesively connected to the support component.

10 Claims, 1 Drawing Sheet

(56) References Cited

U.S. PATENT DOCUMENTS

2016/0043448 A1 2/2016 Fritz
2017/0012269 A1 1/2017 Grzywok et al.

FOREIGN PATENT DOCUMENTS

DE 10 2013 207 356 A1 10/2014
DE 10 2014 205 465 A1 9/2015

OTHER PUBLICATIONS

German-language Written Opinion (PCT/ISA/237) issued PCT Application No. PCT/EP2016/078509 dated Jan. 5, 2017.
German-language Search Report issued in German Application No. 10 2015 224 785.6 dated Jul. 27, 2016 with partial English Translation (thirteen (13) pages).

* cited by examiner

CELL CONTACT-MAKING SYSTEM, CELL MODULE AND METHOD FOR PRODUCING A CELL MODULE

CROSS REFERENCE TO RELATED APPLICATIONS

This application is a continuation of PCT International Application No. PCT/EP2016/078509, filed Nov. 23, 2016, which claims priority under 35 U.S.C. § 119 from German Patent Application No. 10 2015 224 785.6, filed Dec. 10, 2015, the entire disclosures of which are herein expressly incorporated by reference.

BACKGROUND AND SUMMARY OF THE INVENTION

The invention relates to a cell contact-making system for a cell module which includes at least two electrochemical cells. At least one support component, which can be fixed to another cell module, supports at least one cell connector. The cell connector electrically connects the two electrochemical cells to one another. At least one covering component covers the cell connector on a side which is averted from the electrochemical cells.

The invention further relates to a cell module including at least two electrochemical cells and at least one cell contact-making system for the electrical interconnection of the electrochemical cells.

The invention further relates to a method for producing a cell module.

In electrically-powered motor vehicles, specifically hybrid vehicles and electric vehicles, rechargeable batteries are installed, which have a plurality of electrically-interconnected electrochemical cells. By means of the batteries, electrical energy can be supplied to the electric propulsion devices of electrically-powered vehicles. For this purpose, electrochemical cells can be combined to form electrically-interconnected battery sub-units or "cell modules".

As high electric currents flow in a cell module, the electrical components of the cell module must be arranged such that they are inaccessible from the exterior. Moreover, components should be protected against external mechanical influences. In order to achieve this, the fitting of a contact protection guard to a cell module is known, which covers the cell module on the side thereof on which the electrochemical cells are electrically interconnected by way of cell connectors. In general, a covering component employed for this purpose is of rigid design. The covering component can be configured, for example, as an injection-molded component or as a thermoformed component. The covering component is customarily fitted manually to the other cell module, and is latched to the latter.

One object of the invention is to provide a cell contact-making system which can be produced in an automated and cost-effective manner, with integral contact protection guard.

This and other objects are achieved by a cell contact-making system according to the invention, for a cell module which comprises at least two electrochemical cells. At least one support component, which can be fixed to another cell module, supports at least one cell connector, which electrically connects the two electrochemical cells to one another. At least one covering component covers the cell connector on a side which is averted from the electrochemical cells. According to the invention, the covering component is produced from a flexible plastic film and, in a stretched state, is partially cohesively connected to the support component.

The covering component according to the invention is not of a conventional rigid design, produced to a specific shape by one of the above-mentioned processes. Consequently, no corresponding mold tools are required for the manufacture of the covering component according to the invention, thereby rendering the production of the covering component according to the invention, and thus of the cell contact-making system according to the invention, more cost-effective.

Moreover, the manufacture of the cell contact-making system according to the invention involves no manual process steps, and is thus fully automatable, thereby additionally reducing production costs. Conversely, a contact protection guard conventionally requires manual attachment to the other cell module.

The invention provides a further advantage, in that a flexible plastic film, for example in the form of a roll material, is employed for the configuration of the covering component, which is significantly more cost-effective than the conventional employment, for example, of a thermoformed plastic blank. The use according to the invention of a flexible plastic film for the configuration of the covering component is moreover associated with an exceptionally high flexibility in production, with respect to different cell module sizes, and thus to covering components of different sizes.

A cell contact-making system according to the invention can also comprise three or more, and specifically a plurality of electrochemical cells, which can be mutually electrically interconnected in pairs. The electrochemical cells can be configured, for example, as lithium-ion accumulator cells, as lithium-polymer accumulator cells or as nickel-metal hybrid accumulator cells.

The support component can be fitted to the other cell module in a force-fitted, a form-fitted and/or a cohesively-connected arrangement. Preferably, the support component is detachable from the other cell module in a non-destructive manner, in order to permit the execution, for example, of inspection and/or servicing operations on the cell module. The support component can also carry two or more cell connectors, by which at least three electrochemical cells are mutually electrically interconnectable. The support component is a single- or multi-part component of an electrically-insulating material. The support component can additionally fulfill further functions such as, for example, the insulation of the cell side walls.

The coverage by the covering component of the at least one cell connector on a side which is averted from the electrochemical cells signifies that the cell connector is not accessible from this side of the cell module, such that the covering component constitutes an optimum contact protection guard.

For the production of the cell contact-making system or the covering component according to the invention, a film section of a predetermined size can first of all be paid-out from a supply roll, and thereafter separated from the remainder of the plastic film. The separated film section or the flexible plastic film can then be tensioned, in order to extend substantially in a plane. In this tensioned state, the flexible plastic film can be arranged on the support component, and thereafter partially cohesively connected to the support component. One or more of these process steps, and specifically all of these process steps, can be executed automatically. The partial cohesive connection of the covering component to the support component is preferably executed such that the cohesive connection, insofar as possible, permanently maintains the tensioned state of the covering component. The cohesive connection can be configured, for example, in the form of two mutually parallel and mutually spaced-apart connecting lines. Alternatively, the cohesive connection can be configured in the form of a closed, specifically an O-shaped connecting line.

The cohesive connection between the covering component and the support component can be configured by various measures. For example, the cohesive connection can be configured by way of (thermal) sealing, welding or adhesive bonding. A welded connection of this type can be formed, for example, by laser welding.

According to an advantageous embodiment, the support component has a base, upon which the cell connector is arranged, and a side wall, averted from the electrochemical cells, which is arranged at least partially peripherally to the base, wherein the covering component is cohesively connected to the side wall. By use of the side wall, which is arranged partially or fully peripherally to the base, the covering component can be maintained with a clearance to the at least one cell connector.

According to an alternative and further advantageous embodiment, the support component has a base, upon which the cell connector is arranged, a first side wall, which is arranged at least partially peripherally to the base and averted from the electrochemical cells, and a second enclosing side wall, which is connected to the first side wall and is arranged at least partially peripherally to the exterior of the first side wall, with a clearance thereto, wherein the second side wall projects beyond the first side wall on the side which is averted from the electrochemical cells, and wherein the covering component is optionally cohesively connected to one of the two side walls. By use of the first side wall, which is arranged partially or fully peripherally to the base, or the second enclosing side wall, which is arranged partially or fully peripherally to the exterior of the first side wall, with a clearance thereto, the covering component can be maintained with a clearance to the at least one cell connector. If the covering component is firstly connected to the second side wall, the cohesive connection between the second side wall and the covering component, if required, can be at least partially released, in particular by the partial destruction of the covering component in the region of the cohesive connection. Thereafter, the section released from the second side wall, at a different point on said section, can be cohesively connected to the first side wall. This is specifically possible, as the first side wall defines a smaller surface area for the arrangement of the covering component than the second side wall. Consequently, an at least partial removal and re-application of the covering component to the support component is possible, by way of a further cohesive connection.

According to a further advantageous embodiment, it is provided that the covering component is cohesively connected to a free end face of the side wall. The free end face of the respective side wall is very easily accessible from the exterior, thereby facilitating the formation of the cohesive connection between the covering component and the support component.

A cell module according to the invention includes at least two electrochemical cells and at least one cell contact-making system for the mutual electrical interconnection of the electrochemical cells, wherein the cell contact-making system is configured according to one of the above-mentioned configurations, or any combination thereof.

The advantages specified above with respect to the cell contact-making system are correspondingly associated with the cell module. The cell module can be employed for the configuration of a rechargeable battery in an electrically-powered motor vehicle. A method according to the invention for producing a cell module comprises the following steps: (a) the manufacture of a compact structural unit, comprising at least two electrochemical cells and, where applicable, a housing which partially encloses said electrochemical cells; (b) the arrangement of a support component on the electrochemical cells, upon which at least one cell connector for the mutual electrical interconnection of the two electrochemical cells is arranged; (c) the cohesive connection of the cell connector with one electrical terminal of the two electrochemical cells respectively; (d) the arrangement of a covering component formed of a flexible plastic film, in a tensioned state, on the support component; and (e) the partial cohesive connection of the covering component with the support component.

The advantages specified above with respect to the cell contact-making system are correspondingly associated with the method. The production of the compact structural unit can include a directly adjoining arrangement of electrochemical cells in a single row. Additionally, the electrochemical cells which are combined in this manner can be arranged in a housing which at least laterally encloses the electrochemical cells. The arrangement of the support component on the electrochemical cells or on the housing can be a form-fitted and/or force-fitted connection, for example, for the latching of these components to each other. The cohesive connection of the cell connector to the respective electrical terminal of an electrochemical cell can be executed by way of a welding process. A number or all of the steps of the method according to the invention can be executed automatically.

According to an advantageous configuration, the flexible plastic film is paid-out automatically from a supply roll, and is cut to length to form the covering component. This is associated with the simple, flexible, automated and cost-effective production of the covering component.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
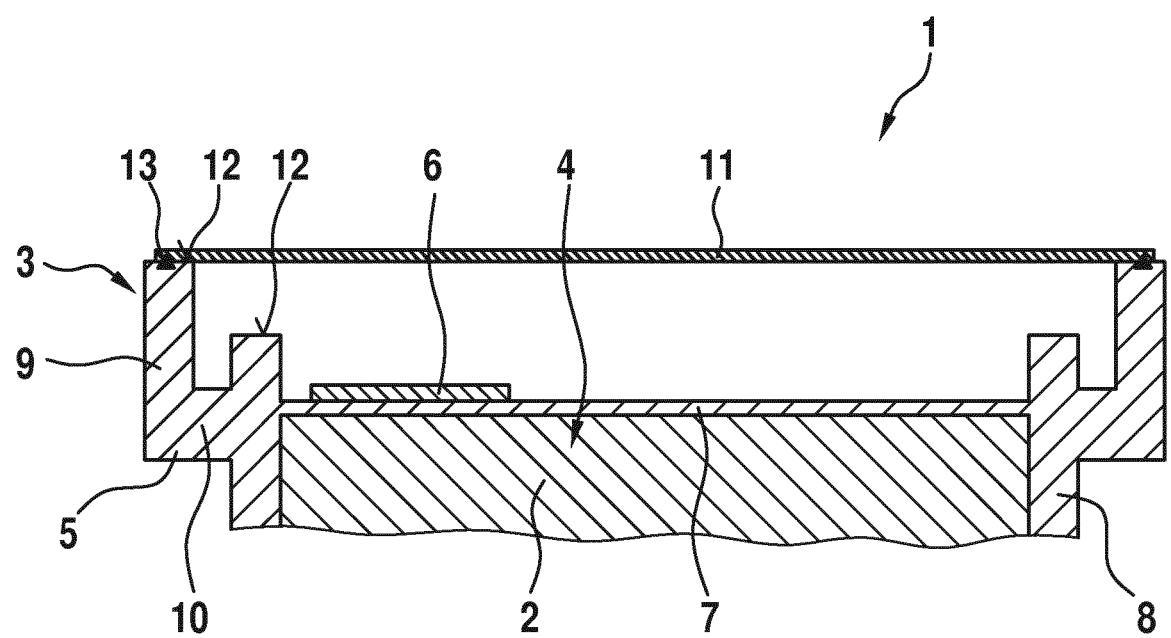
FIG. 1 is a schematic cross-sectional representation of an exemplary embodiment of a cell module according to the invention.

FIG. 1 shows a schematic cross-sectional representation of an exemplary embodiment of a cell module 1 according to the invention. The cell module 1 has at least two electrochemical cells 2, of which only one is represented in FIG. 1. The cell module 1 further includes a cell contact-making system 3 for the mutual electrical interconnection of the electrochemical cells 2.

The cell contact-making system 3 includes a support component 5 which is fixed to another cell module 4, for supporting at least one cell connector 6 which mutually electrically interconnects the two electrochemical cells 2.

The support component 5 has a base 7, upon which the cell connector 6 is arranged. The support component 5 further includes a first side wall 8, which is arranged peripherally to the base 7 and extends away from the electrochemical cells 2. The support component 5 further includes a second enclosing side wall 9, which is connected to the first side wall 8 and is arranged peripherally to the exterior of the first side wall 8, with a clearance thereto. The second side wall 9 can project beyond the first side wall 8, on the side thereof which is averted from the electrochemical cells 2, or can be configured to an equal height. The first side wall 8 is connected to the second side wall 9 by means of a peripheral web 10. The support component 5 is of a one-piece design.

The cell contact-making system 3 further includes a covering component 11, which covers the cell connector 6 on a side thereof which is averted from the electrochemical cells 2. The system also includes the electrochemical cells 2. The covering component 11 is produced from a flexible plastic film and, in a stretched state, is partially cohesively connected to the support component 5. Specifically, the covering component 11 is peripherally cohesively connected to the second side wall 9 along a closed connecting line. The covering component 11 in this case is connected to a free end face 12 of the second side wall 9 by way of a cohesive connection 13.

Figure 2:
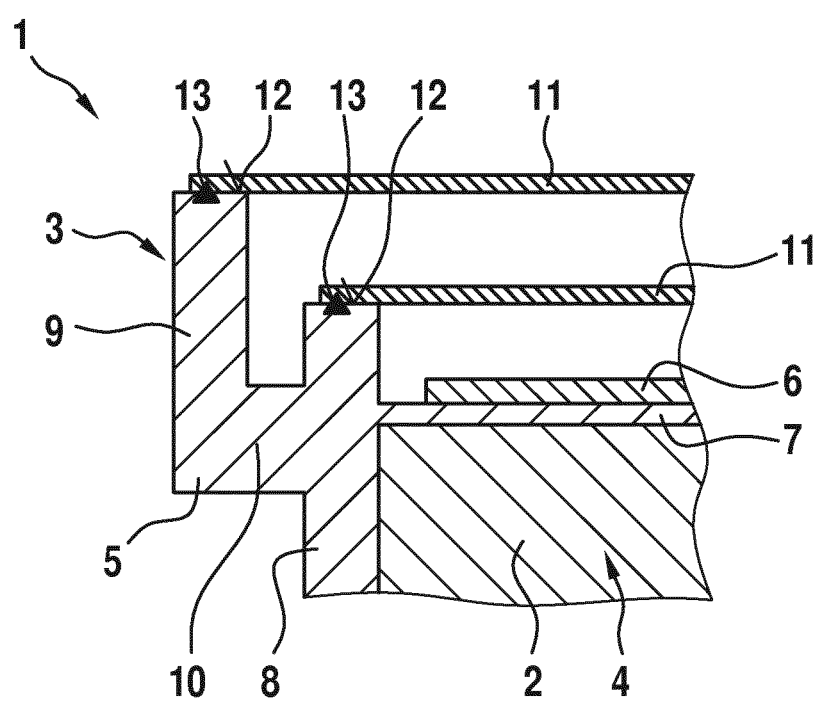
FIG. 2 is a schematic cross-sectional representation of a detailed section of the cell module represented in FIG. 1.

FIG. 2 shows a schematic cross-sectional representation of a detailed section of the cell module 1 represented in FIG. 1. From this representation, two alternative arrangements of the covering component 11 on the support component 5 can be inferred, wherein the covering component 11 is optionally cohesively connected with one of the two side walls 8 or 9. The covering component 11 can firstly be cohesively connected to the free end face 12 of the second side wall 9. If required, the cohesive connection 13 between the covering component 11 and the second side wall 9 can be at least partially released, or the covering component 11 can be destroyed in this region, in order to permit access to the cell connector 6 and the electrochemical cells 2. Depending upon the embodiment, either the covering component 11 only can be destroyed, or the covering component together with the support component 5. Where the latter is thus destroyed, the second side wall 9 is no longer present thereafter. The covering component 11 can then be cohesively connected to the free end face 12 of the first side wall 8, as a result of which the covering component 11 can be re-used.

LIST OF REFERENCE SYMBOLS

1 Cell module
2 Electrochemical cell
3 Cell contact-making system
4 Other cell module
5 Support component
6 Cell connector
7 Base of 5
8 First side wall of 5
9 Second side wall of 5
10 Web of 5
11 Covering component
12 Free end face of 8, 9
13 Cohesive connection The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cell contact-making system for a cell module having at least two electrochemical cells, comprising:
    at least one support component, which is fixable to another cell module for supporting at least one cell connector which electrically connects the two electrochemical cells to one another, and
    at least one covering component which covers the cell connector on a side which is averted from the two electrochemical cells, wherein
    the covering component is a flexible plastic film and, in a stretched state, is partially cohesively connected to the support component.

2. The cell contact-making system as claimed in claim 1, wherein the support component comprises:
    a base, upon which the cell connector is arranged; and
    a side wall, extending away from the electrochemical cells, which is arranged at least partially peripherally to the base, wherein
    the covering component is cohesively connected to the side wall.

3. The cell contact-making system as claimed in claim 1, wherein the support component comprises:
    a base, upon which the cell connector is arranged;
    a first side wall, which is arranged at least partially peripherally to the base and extends away from the electrochemical cells; and
    a second enclosing side wall, which is connected to the first side wall and is arranged at least partially peripherally to an exterior of the first side wall, with a clearance thereto, wherein
    the second side wall projects beyond the first side wall on the side which is averted from the electrochemical cells, and
    the covering component is selectively cohesively connected to one of the two side walls.

4. The cell contact-making system as claimed in claim 2, wherein
    the covering component is cohesively connected to a free end face of the side wall.

5. The cell contact-making system as claimed in claim 3, wherein
    the covering component is cohesively connected to a free end face of the side wall.

6. A cell module, comprising:
    at least two electrochemical cells; and
    at least one cell contact-making system as claimed in claim 1 for mutual electrical interconnection of the electrochemical cells.

7. The cell module as claimed in claim 6, wherein the support of the system component comprises:
    a base, upon which the cell connector is arranged; and
    a side wall, extending away from the electrochemical cells, which is arranged at least partially peripherally to the base, wherein
    the covering component is cohesively connected to the side wall.

8. The cell module as claimed in claim 6, wherein the support component comprises:
    a base, upon which the cell connector is arranged;
    a first side wall, which is arranged at least partially peripherally to the base and extends away from the electrochemical cells; and a second enclosing side wall, which is connected to the first side wall and is arranged at least partially peripherally to an exterior of the first side wall, with a clearance thereto, wherein the second side wall projects beyond the first side wall on the side which is averted from the electrochemical cells, and the covering component is selectively cohesively connected to one of the two side walls.

9. A method for producing a cell module, the method comprising the acts of:

manufacturing a compact structural unit, comprising at least two electrochemical cells and, where applicable, a housing which partially encloses said electrochemical cells;

arranging a support component on the electrochemical cells, upon which at least one cell connector for mutual electrical interconnection of the two electrochemical cells is arranged;

cohesively connecting the cell connector with one electrical terminal, respectively, of the two electrochemical cells;

arranging a covering component formed of a flexible plastic film, in a tensioned state, on the support component; and at least partially cohesively connecting the covering component with the support component.

10. The method as claimed in claim 9, wherein the flexible plastic film is paid-out automatically from a supply roll, and is cut to length to form the covering component.

* * * * *